(12) United States Patent
Reid et al.

(10) Patent No.: US 6,758,875 B2
(45) Date of Patent: Jul. 6, 2004

(54) AIR CLEANING SYSTEM FOR A ROBOTIC WELDING CHAMBER

(75) Inventors: James Kenneth Reid, Royal Oak, MI (US); John Robert Reid, Royal Oak, MI (US)

(73) Assignee: Great Lakes Air Systems, Inc., Clawson, MI (US)

( * ) Notice: Subject to any disclaimer, the term of this patent is extended or adjusted under 35 U.S.C. 154(b) by 0 days.

(21) Appl. No.: 10/209,020

(22) Filed: Jul. 31, 2002

(65) Prior Publication Data

US 2003/0089087 A1 May 15, 2003

Related U.S. Application Data

(60) Provisional application No. 60/356,429, filed on Nov. 13, 2001.

(51) Int. Cl.$^7$ ............................................. B01D 46/00
(52) U.S. Cl. .................. 55/385.2; 55/302; 55/283; 55/DIG. 18; 55/DIG. 36; 95/278; 95/280; 266/48; 266/49; 454/49; 454/63; 454/66
(58) Field of Search ....................... 55/302, 283, 385.2, 55/DIG. 18, DIG. 36; 95/278, 280; 266/48, 49; 454/49, 63, 66

(56) References Cited

U.S. PATENT DOCUMENTS

| | | | | |
|---|---|---|---|---|
| 2,341,628 A | * | 2/1944 | Koweindl | ............. 55/DIG. 18 |
| 4,091,719 A | * | 5/1978 | Galloway | ............. 55/DIG. 18 |
| 4,359,330 A | * | 11/1982 | Copley | ............. 55/302 |
| 4,364,751 A | * | 12/1982 | Copley | ............. 55/302 |
| 4,610,704 A | | 9/1986 | Richard | |
| 4,655,806 A | | 4/1987 | Bowersox | |
| 5,147,427 A | * | 9/1992 | Abbot et al. | ............. 55/302 |
| 5,169,307 A | | 12/1992 | Frye | |
| 5,271,750 A | | 12/1993 | Abbott et al. | |
| 5,281,246 A | * | 1/1994 | Ray et al. | ............. 55/302 |
| 5,376,171 A | | 12/1994 | Frye | |
| 5,511,764 A | * | 4/1996 | Wonsetler | ............. 55/DIG. 18 |
| 6,036,736 A | * | 3/2000 | Wallace et al. | ............. 55/385.2 |
| 6,290,740 B1 | * | 9/2001 | Schaefer | ............. 55/385.2 |

* cited by examiner

Primary Examiner—Minh-Chau T. Pham
(74) Attorney, Agent, or Firm—Howard & Howard

(57) ABSTRACT

A robotic welding station cleaning assembly (10) for removing particulates from an air-filled chamber surrounding a welding robot (12). A frame (14) is positioned about the robot (12) and includes a top (20) defining an opening (26) therein. A shield (28) is supported by the frame (14) to define the robot chamber. A spark arrestor (48) is supported on the frame (14) for controlling sparks created by welding. A blower housing (30) having an inlet (27) is disposed immediately above and in direct fluid communication with the opening (26) to move air from the chamber to the blower housing (30). The frame (14) includes a separate support stand (32) for supporting the blower housing (30) on the top (20) of the chamber.

12 Claims, 4 Drawing Sheets

AIR CLEANING SYSTEM FOR A ROBOTIC WELDING CHAMBER

CROSS-REFERENCE TO RELATED APPLICATIONS

This application claims the benefit of U.S. Provisional Patent Application 60/356,429 filed Nov. 13, 2001.

FIELD OF THE INVENTION

The subject invention generally relates to an air cleaning system and, more particularly, to an air cleaning system for welding chambers.

BACKGROUND OF THE INVENTION

Air cleaning systems are well known throughout several industries where maintaining a clean environment is critical. For example, in vehicle manufacturing, welding processes are necessary for welding steel frames for vehicles. Typically, such welding processes are carried out in a welding chamber wherein dust particulates are generated and infiltrate the air. Often, such welding processes are conducted by robotically controlled equipment.

Generally, the air cleaning system resides on the floor of a manufacturing facility in close proximity to the area to be cleaned and occupies a significant amount of floor space in the plant, or is mounted outside of the facility. If it is mounted in the plant, it occupies valuable floor space. If it is mounted outside the facility, the system is connected to the area by large air ducts through which dust-laden or cleaned air travels. Thus, relocating the air cleaning system about the facility requires the air ducts to be re-routed.

These air cleaning systems have several disadvantages. First, they are generally substantial in size in order to accommodate industrial applications. Consequently, they occupy large amounts of floor space in and around the manufacturing facility and require a significant amount and complex routing of air ducts, resulting in increased costs and making relocation difficult, time-consuming and costly. In addition, dust from the air traveling through the ducts accumulates on the walls of the ducts, which can become heavy and pull the duct down.

The present invention is aimed at solving one or more of the problems described above.

SUMMARY OF THE INVENTION AND ADVANTAGES

The subject invention is an air cleaning assembly for removing particulates from a work chamber surrounding a welding robot. A frame is disposed about the robot and includes sides and a top, the top defining an opening therein. A shield is supported by the frame about the sides to define a robot chamber. A spark arrestor is supported on the frame for controlling sparks created by welding. A blower housing having an inlet is disposed immediately above and in direct fluid communication with the opening to move air from the chamber to the blower housing. The only other openings are in the front of the chamber, or minimally along the sides, to force air from the front to the back of the chamber.

The present invention provides requires no floor space, thereby increasing floor space available in the manufacturing facility and eliminates ducts between the air cleaning blower assembly and the robot chamber thereby reducing the potential for accumulated dust to ignite, and utilizes a smaller blower due to decreased resistance.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
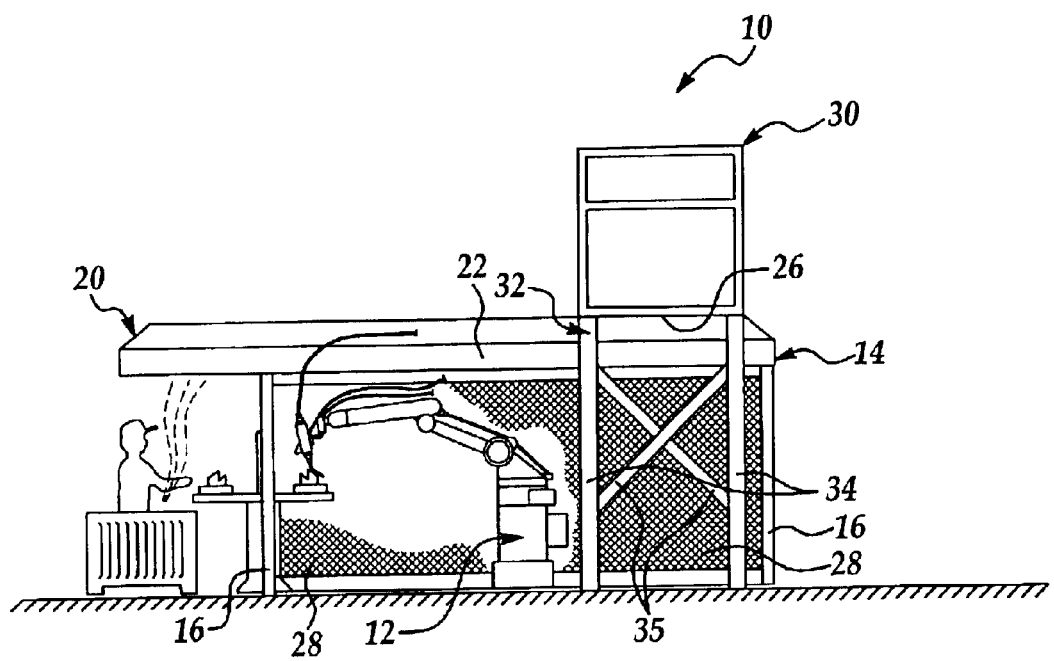
FIG. 1 is a side elevational view of an assembly constructed in accordance with the subject invention.

Referring to the Figures, wherein like numerals indicate like or corresponding parts throughout the several views, a robot welding station and air cleaning assembly is generally shown at 10.

Referring to FIGS. 1 through 8, the assembly 10 includes a welding robot generally indicated at 12. A frame, generally indicated at 14, is disposed about the robot 12. The frame 14 includes posts 16 having feet or pads 18 for resting upon a floor, or the like. The posts 16 support a top, generally indicated at 20, defined by beams 22 and a cover 24. The cover 24 closes the top 20 except for an opening 26 therein. A shield, comprising a screen 28, is supported by the frame 14 by extending between the posts 16 thereof. The screen 28 with the top 20 defines a robot chamber.

The assembly 10 further includes a blower housing, generally indicated at 30, having an inlet 27 disposed immediately above and in direct fluid communication with the opening 26 into the robot chamber to move air from the chamber to the blower housing 30. The inlet 27 is in fluid communication with and feeds air to an inlet plenum 29. The housing 30 includes an access door permitting access to the interior of the housing 30 for service.

Figure 2:
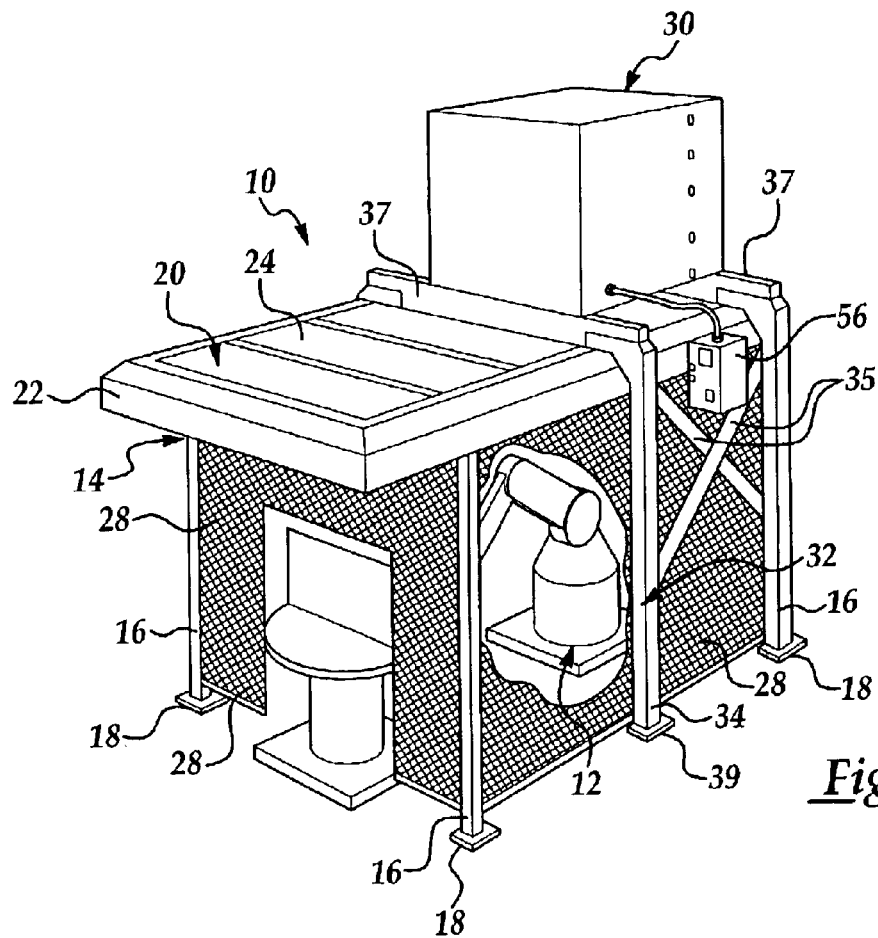
FIG. 2 is a perspective view of the assembly of FIG. 1.

In the variation of FIGS. 1 and 2, the frame 14 includes a support stand, generally indicated at 32, supporting the blower housing 30 on the top 20 of the chamber. The support stand 32 includes legs 34 disposed on opposite sides of the chamber and supporting the blower housing 30 independently of the posts 16. A pair of the legs 34 is disposed on each of the opposite sides and cross trusses 35 interconnect the legs 34 of each pair. A pair of cross beams 37 extend across the top 20 to interconnect the opposite pairs of legs 34 and support the blower housing 30 thereon. The legs 34 also include pads 39 for resting upon a floor.

Figure 8:
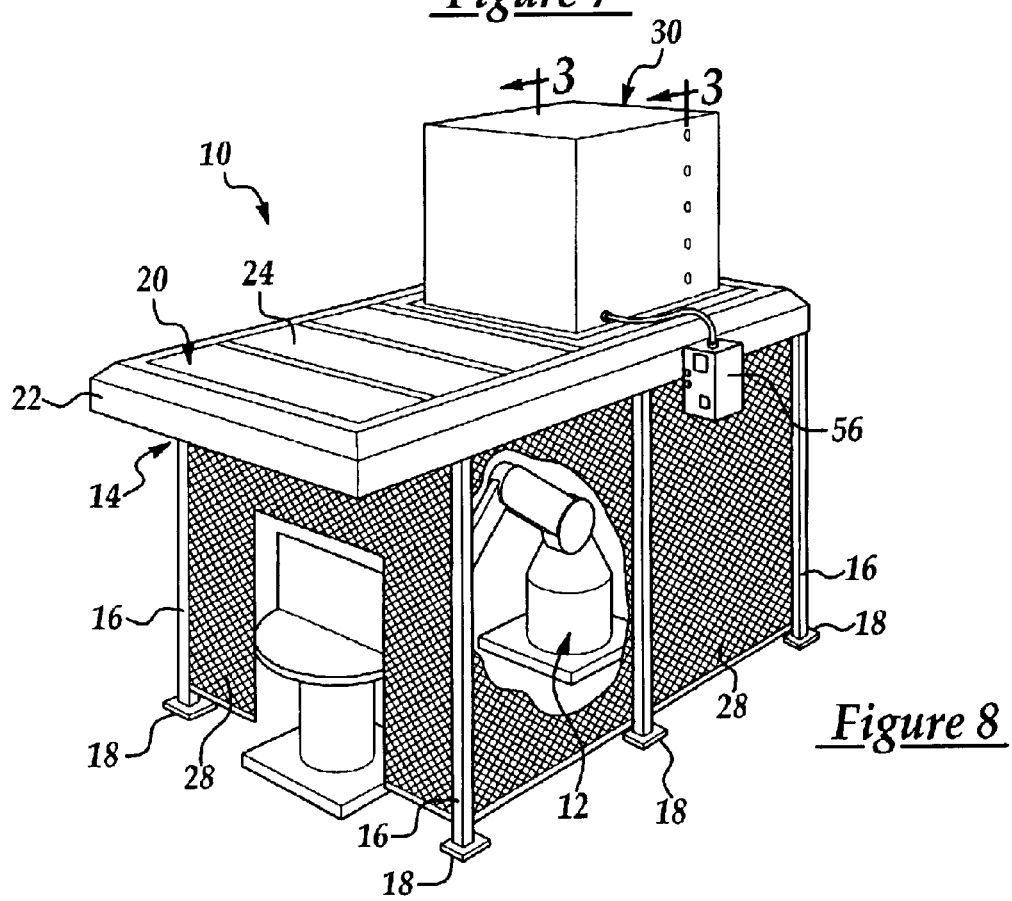
FIG. 8 is a perspective view of the assembly wherein the frame alone supports the blower over the robot chamber.

In the variation of FIG. 8 the blower housing 30 is supported on the top 20. The blower housing 30 is supported by the beams 22 and/or the cover 24 of the top 20 and/or posts 16.

The blower housing 30 includes a blower 36 disposed in the housing 30, a motor 40 coupled to the blower 36, and a plurality of filters 42 removably disposed on the housing 30. The blower 36 may have an air foil design or any other suitable design. The blower 36 may further include a venturi 38 for improving or controlling air flow. The blower housing 30 may be lined with a dampener 44 for providing quiet operation. The dampener 44 includes a thick polyurethane acoustical foam or any other suitable foam. In addition, the dampener 44 is be covered with a mylar film to protect it, thereby, reducing maintenance.

Figure 3:
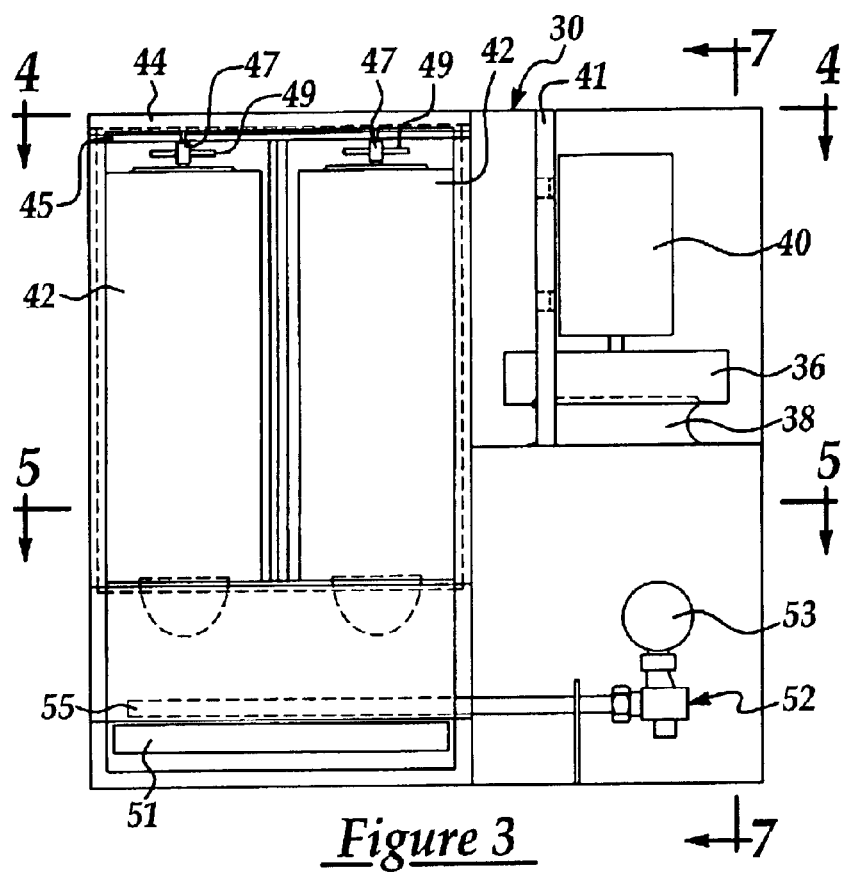
FIG. 3 is a cross-sectional side view take along line 3—3 of FIG. 8.
Figure 4:
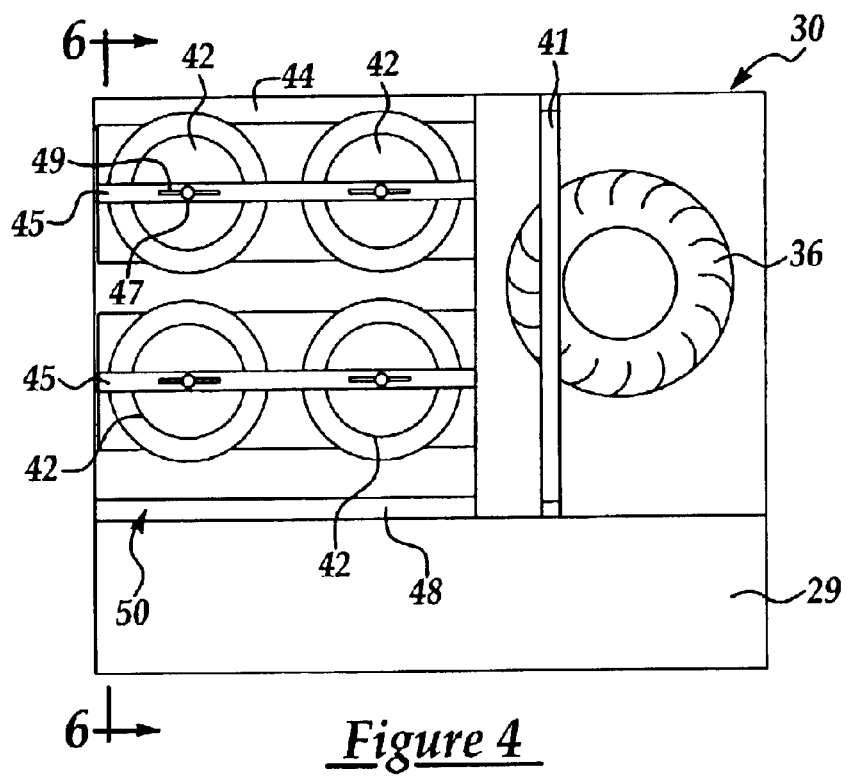
FIG. 4 is a cross-sectional top view taken along line 4—4 of FIG. 3.

Referring to FIGS. 3 and 4, the motor 40 is mounted on a support 41 in the clean air stream to provide maximum heat dissipation. It will be appreciated that the motor 40 may be mounted in any suitable location. The motor 40 may be a direct drive motor or any other suitable motor.

The filters 42 may be pleated filters having a blend of non-woven filter media or any other suitable filter design. As shown, each filter 42 further includes a venturi 43 for maximizing the pulse charge to clean the filter. The filters 42 may be disposed on the housing 30 with a gasket (not shown) or any other suitable sealant. In addition, the filters 42 may be individually attached to a filter rack 45 by a threaded clamping device 47 and a hand knob 49, thereby eliminating the need for tools to service the filters 42.

Figure 5:
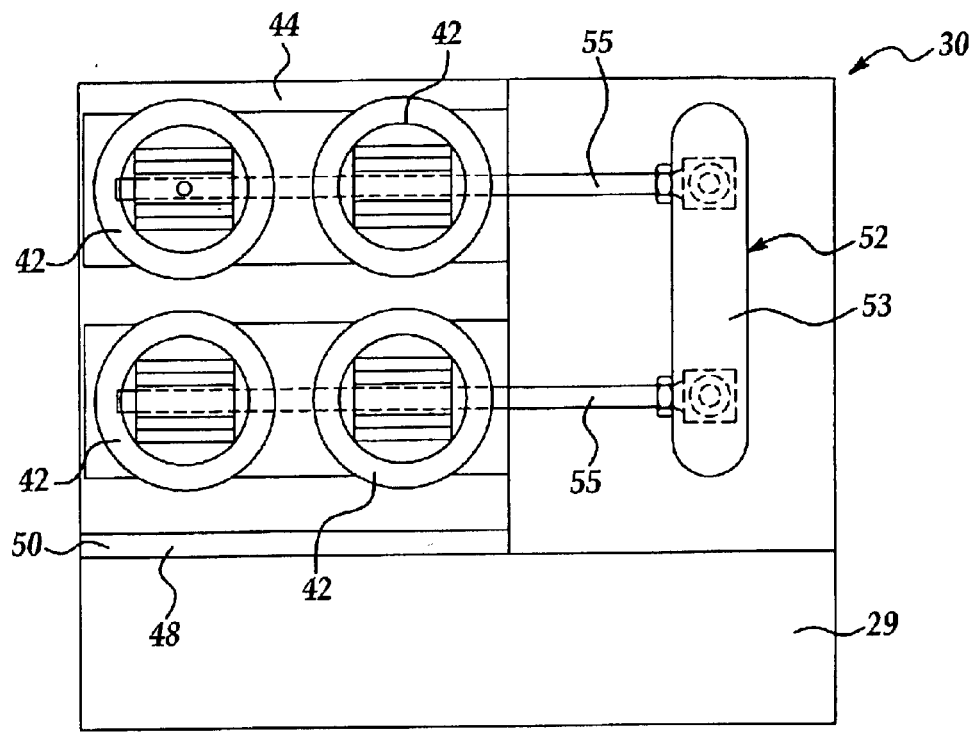
FIG. 5 is a cross-sectional top view taken along line 5—5 of FIG. 3.
Figure 6:
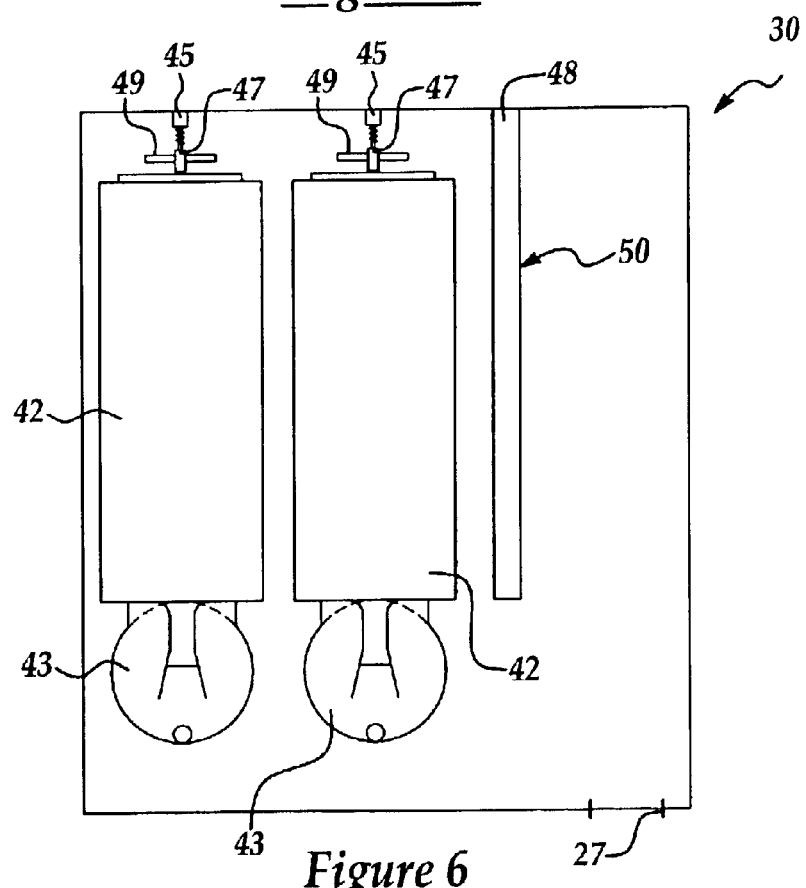
FIG. 6 is a cross-sectional side view taken along line 6—6 of FIG. 4.

Referring to FIGS. 4–6, the assembly 10 further includes a spark arrestor, generally indicated at 48, disposed in the housing 30 and supported by the frame 14 for controlling or suppressing sparks created by welding. The spark arrestor 48 captures and extinguishes sparks, thereby reducing the potential for fire.

The spark arrestor 48 includes a baffle 50 removably disposed on the housing 30 for removing the particulates from the air chamber. The cover 24 of the top 20 may be removable therefrom. The support stand 32, with the housing 30 supported thereon, may also be mounted within the chamber. The top 20 of the chamber is then placed in position about the housing 30. The housing 30 resides over the top 20 and thereby avoids independent placement on a manufacturing plant floor, thereby conserving floor space within the manufacturing plant. The housing 30 has a reduced footprint and occupies less space, yet provides filtering abilities of larger housings and because there is no ducting to a remote blower housing, the potential for fire is greatly reduced.

Figure 7:
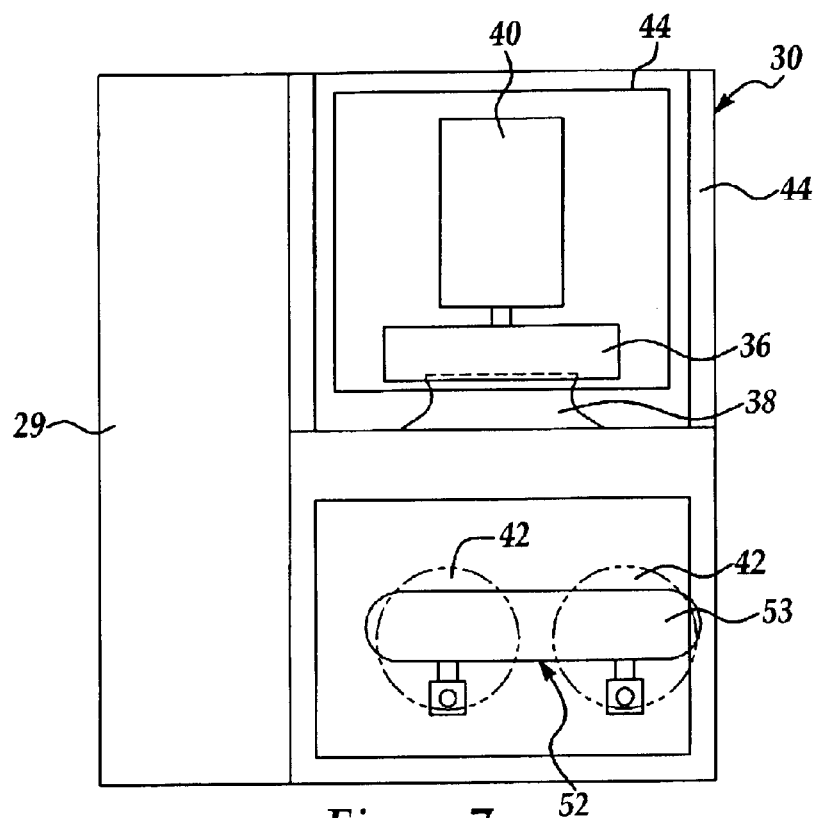
FIG. 7 is a cross-sectional side view taken along line 7—7 of FIG. 3.

Referring to FIGS. 3, 5 and 7, the assembly 10 includes a filter cleaning system 52 disposed on the housing 30 for removing accumulated particulates from the filters 42. The filter cleaning system 52 may be a pulse cleaning system or any other suitable system. The cleaning system 52 includes an air tank 53 and pulse tubes 55 and operates by delivering an electrically actuated compressed reverse pulse of air through the entire surface of each individual filter element. The pulse of air is controlled by a pulse timer in a programmable solid state controller 56. Each filter 42 further includes a venturi 43 for maximizing the pulse charge.

In operation, air enters the housing 30 through the inlet plenum 29, which is located at the bottom of the housing 30, and turns ninety degrees to pass through the spark arrestor 48 and removable baffles 50. Then, laminar air flows through the filters 42. The removable baffles 50 separate larger, heavier particulates, thereby reducing the load of particulates impinging the filters 42. The smaller, finer particulates are collected on the surface of the filters 42 as the air flows through them. The clean air is then exhausted by the blower 36 out of the housing 30. The particulates collected on the filters 42 are discharged from the filter surface by the reverse pulse and, then, fall into a disposal tray 51 disposed at the bottom of the housing 30 below the filters 42.

Obviously, many modifications and variations of the present invention are possible in light of the above teachings. The invention has been described in an illustrative manner, and it is to be understood that the terminology that has been used is intended to be in the nature of words of description rather than limitation. It will be apparent to those skilled in the art that many modifications and variations of the present invention are possible in light of the above teachings. Therefore, it is to be understood that the invention may be practiced otherwise than as specifically described.

What is claimed is:

1. A robotic welding station air cleaning assembly comprising:
   a welding robot;
   a frame disposed about said robot including spaced posts defining sides and beams defining a top;
   said top defining an opening therein;
   a shield supported by said frame to define a closed robot chamber with said opening therein;
   a spark arrestor supported on said frame for controlling sparks created by welding in said chamber;
   a blower housing disposed between said beams and having an inlet disposed immediately above and in direct fluid communication with said opening in said top to move air from said chamber to said blower housing; and
   a filter supported by said blower housing for removing dust from the air.

2. An assembly as set forth in claim 1 wherein said top is closed except for said opening therein.

3. An assembly as set forth in claim 1 wherein said blower housing is supported on said beams of said top.

4. An assembly as set forth in claim 1 wherein said frame includes a support stand supporting said blower housing on said top of said chamber.

5. An assembly as set forth in claim 4 wherein said support stand includes legs disposed on opposite sides of said chamber and supporting said blower housing independently of said posts.

6. An assembly as set forth in claim 5 including a pair of said legs on each of said opposite sides and cross trusses interconnecting said legs of each pair.

7. An assembly as set forth in claim 1 wherein said blower housing includes an outlet and a blower for moving air from said chamber and through said blower housing to said outlet.

8. An assembly as set forth in claim 1 including a dampener disposed on said blower housing.

9. An assembly as set forth in claim 1 wherein the spark arrestor includes a baffle removably disposed on said housing for removing particulates from said air chamber.

10. An assembly as set forth in claim 1 a pulse cleaning system for delivering pulses of air to the filter.

11. An assembly as set forth in claim 10 including a controller for controlling operation of said pulse cleaning system.

12. A robotic welding assembly comprising;
   welding robot for welding within a chamber,
   said chamber defined by a frame disposed about said robot including spaced vertical posts and horizontal beams interconnecting said posts;
   a shield supported by and extending between said posts to defined sides,
   a top supported by said beams and defining an opening therei, supported over and between said beams and blower housing having an inlet disposed immediately above and in direct fluid communication with said opening to move air from said chamber;
   a filter supported by said blower housing,
   a filter cleaning system supported by said housing for cleaning said filter, and
   a spark arrestor supported by said blower housing for controlling sparks generated by welding in said chamber.

* * * * *